United States Patent [19]

McLean et al.

[11] 4,222,809

[45] Sep. 16, 1980

[54] APPARATUS FOR AND METHOD OF REMOVING SCRAP RIBBONS TRIMMED FROM A CARPETING STRIP

[75] Inventors: Michael E. McLean; Rufus N. Ensley, both of Waynesville, N.C.; Anthony J. Alcaraz, Petersburg; Paul E. Caldwell, Dewitt, both of Va.

[73] Assignee: Dayco Corporation, Dayton, Ohio

[21] Appl. No.: 28,785

[22] Filed: Apr. 10, 1979

[51] Int. Cl.$^{2}$ .......................... B32B 31/00; B26D 7/06

[52] U.S. Cl. .................................... 156/267; 156/271; 156/510; 26/96; 83/423

[58] Field of Search ............... 156/267, 271, 324, 510, 156/554; 83/423, 155.1; 26/96

[56] References Cited

U.S. PATENT DOCUMENTS

| | | | |
|---|---|---|---|
| 3,224,313 | 12/1965 | Mohring | 26/96 |
| 3,417,444 | 12/1968 | McCreary | 26/96 |
| 3,514,352 | 5/1970 | Judge | 156/510 |

*Primary Examiner*—Douglas J. Drummond

*Attorney, Agent, or Firm*—Reuben Wolk; Charles E. Bricker

[57] ABSTRACT

An apparatus and method are provided for removing scrap ribbons defined by cutting away opposite side edge portions of a carpeting strip.

20 Claims, 10 Drawing Figures

APPARATUS FOR AND METHOD OF REMOVING SCRAP RIBBONS TRIMMED FROM A CARPETING STRIP

CROSS-REFERENCE TO RELATED APPLICATION

This application is related to copending U.S. Patent Application, Ser. No. 28,787 filed concurrently herewith.

BACKGROUND OF THE INVENTION

1. Field of the Invention

This invention relates to carpeting strips each comprised of a wear layer bonded against a compressible resilient backing material and having integral means enabling a plurality of such carpeting strips to be joined with a substantially invisible seam therebetween, and in particular to an apparatus for and method of removing scrap ribbons trimmed from opposite side edge portions of the carpeting strips.

2. Prior Art Statement

It is known in the art to provide carpeting strips of the character mentioned and as disclosed in U.S. Pat. No. 4,092,450. However, to provide a commercially competitive carpeting strip of the character disclosed in this patent, it is necessary that such strip be produced in a continuous manner with minimum scrap and with optimum utilization of production devices and techniques to assure continuous uninterrupted production.

SUMMARY

It is a feature of this invention to provide in an apparatus for continuously making a carpeting strip having integral joining means of the character mentioned wherein such carpeting strip is carried on tenter pins of a tenter assembly, the improvement in such apparatus comprising a stripping apparatus which enables stripping of trimmed ribbons of the carpeting strip from the tenter pins in an efficient manner.

Another feature of this invention is to provide in a stripping apparatus of the character mentioned a stripping device having a pair of cooperating rotatable rollers consisting of an upper roller and a lower roller and means yieldingly urging at least one of the rollers toward and against the other roller to enable clamping trimmed ribbons therebetween and pulling thereof therethrough with rotation of the rollers, and a trough containing liquid for coating the lower portion of the lower roller with a liquid wherein the liquid serves to prevent sticking of each ribbon against the rollers even with each ribbon having an exposed edge of an adhesive band wherein such edge is defined during trimming.

Another feature of this invention is to provide a stripping device of the character mentioned in which the means yieldingly urging comprises compression spring means.

Another feature of this invention is to provide a stripping device of the character mentioned and further comprising drive means for rotating the lower roller to thereby simultaneously rotate the upper roller urged thereagainst.

Another feature of this invention is to provide a stripping device of the character mentioned in which the lower roller is driven by a variable speed motor and an adjustable air clutch operatively associated therewith.

Another feature of this invention is to provide a stripping device of the character mentioned in which the upper roller and the lower roller each has an outer portion made of a compressible yet resilient polymeric material.

Another feature of this invention is to provide an improved method of stripping trimmed ribbons of a carpeting strip of the character mentioned from tenter pins used to carry the overall carpeting strip prior to the trimming action.

Therefore, it is an object of this invention to provide an improved apparatus and method having one or more of the features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF EXEMPLARY CARPETING STRIP AND CARPET MADE USING APPARATUS AND METHOD OF THIS INVENTION

An exemplary carpeting strip of the type disclosed herein is presented in the previously mentioned U.S. Pat. No. 4,092,450, and the disclosure of this patent is incorporated herein by reference thereto. However, in order to produce such a carpeting strip economically and with sufficient manufacturing precision to enable a typical non-professional carpet installer to install such carpeting strip and still provide a professional quality installation the improved apparatus and method illustrated in FIGS. 1A and 1B are preferably employed.

Figures 1A, 1B, 2, 2A:
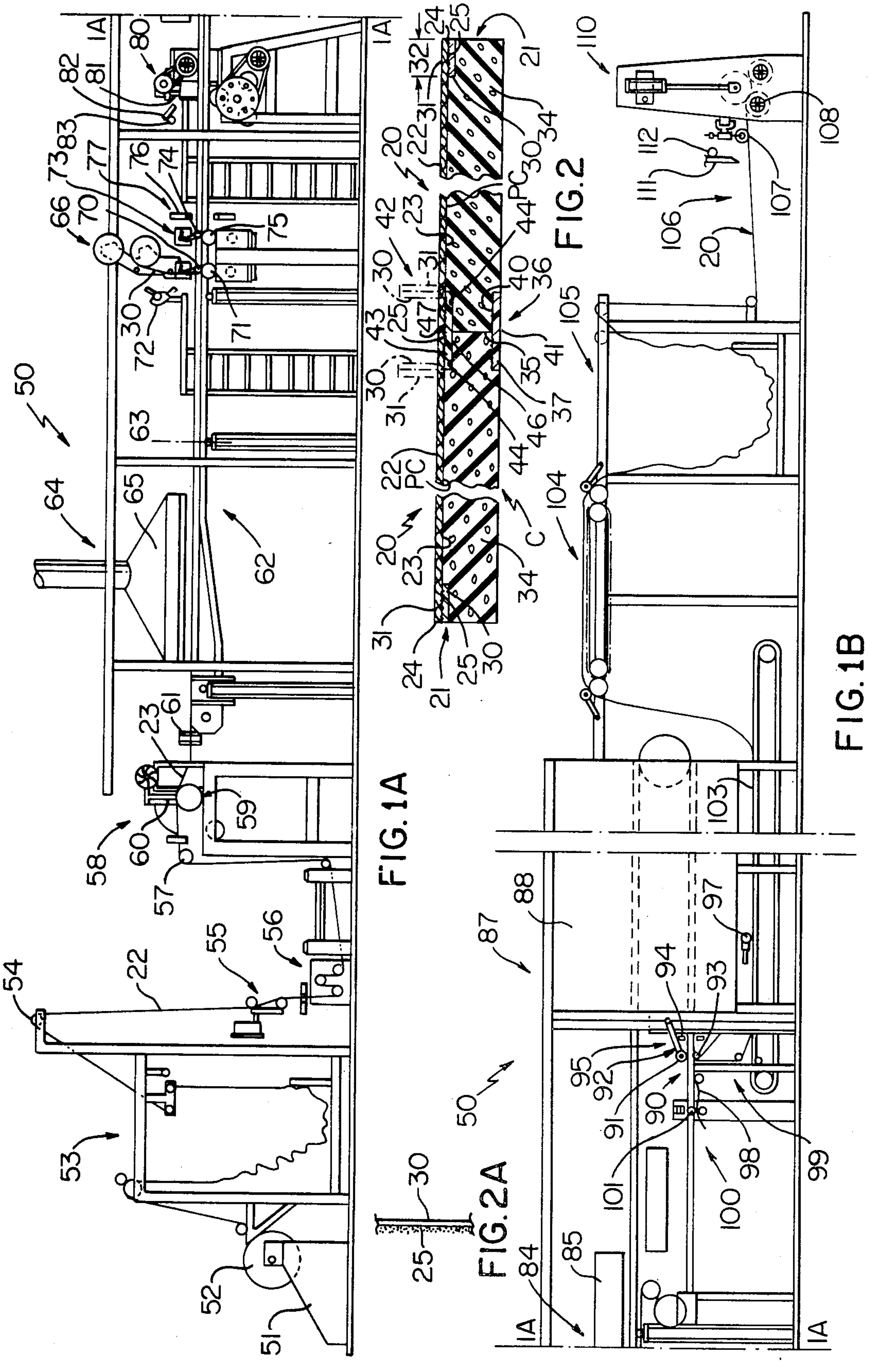
FIGS. 1A and 1B present a view in elevation of an apparatus and method with FIG. 1B being an extension of FIG. 1A upon superimposing the line 1A—1A of FIG. 1B on the line 1A-1A of FIG. 1A, and wherein such apparatus and method are employed in making a carpeting strip in which the apparatus and method of this invention are used.
FIG. 2 is a view, not drawn to scale, with parts in cross-section and parts broken away illustrating a pair of carpeting strips made by the apparatus and method of FIGS. 1A and 1B joined together to define a high strength substantially invisible joint therebetween.
FIG. 2A is an enlarged fragmentary side view particularly showing adhesive material on release tape comprising the carpeting strips of FIG. 2.

Reference is now made to FIG. 2 of the drawing which illustrates two portions of identical carpeting strips 20 (with their center portions broken away) made employing the apparatus and method of FIGS. 1A and 2B and with associated side edges in adjoining relation to define an overall carpet designated generally by the reference letter C. Each carpeting strip 20 has integral means on opposite side edges thereof and each designated generally by the reference numeral 21 for defining a substantially invisible seam between strip 20 and a substantially identical strip. Each carpeting strip 20 comprises a wear layer 22 having a bottom or inside surface 23 and such wear layer has opposed side edges each designated by the same reference numeral 24. An adhesive material in the form of a strip-like band or coating 25 is provided on the bottom surface 23 adjacent each side portion of the strip 20 and such coating is indicated by stipling in the form of spaced dots. The adhesive 25 may be in the form of adhesive material applied directly against the bottom surface 23 and protected with release tape which is free of adhesive, a comparatively thin so-called double-adhesive back tape protected on its surface away from surface 23 with release tape, adhesive material initially provided as a layer on a release tape and which remains adhered to the surface 23 upon removal of the release tape, or any suitable similar material whereby such release tape is designated by the reference numeral 30. The release tape 30 at each side portion of strip 20 enables the carpeting strip to be manufactured while defining a free part 31 of the wear layer 22 along its length and such free part 31 has a width 32 defined by the width of release tape 30 associated therewith.

The release tape 30 of this example of the invention has one surface thereof provided with a meltable adhesive 25 thereon (FIG. 2A) and such adhesive is disposed against the inside surface 23 of the wear layer 22 and serves to hold the tape 30 firmly in position. The meltable adhesive 25 on the release tape 30 is activated by heating thereof so that it will adhere to the inside surface of the wear layer 22 and such adhesive 25 remains on the wear layer 22 once the tape 30 is removed whereupon the adhesive 25 is then used in joining carpeting strips 20 to define the carpet C as will be described in more detail subsequently.

The carpeting strip 20 has a compressible polymeric sponge-like or foam-like backing material 34 bonded against its wear layer 22 and in particular, against surface 23 of such wear layer except at locations covered by the release tape. The release tape 30 at each side of strip 20 is, in essence, a dual-purpose tape which serves to isolate and maintain adhesive 25 ready for use by providing a freshly exposed adhesive surface upon exposing such adhesive 25 by removal of the tape 30 as well as isolating a width portion of the compressible backing material 34 from the wear layer 22 upon integrally forming the backing material 34 against the tape 30. Each tape 30 defines the above-mentioned free part 31 of the wear layer 22 for a purpose now to be described.

In particular, to install a pair of carpeting strips 20 in adjoining relation to define a carpet C as illustrated in FIG. 2, a pair of carpeting strips 20 are placed with associated edges 35 in abutting relation as shown at 36 in FIG. 2. If desired, a suitable so-called double-adhesive-back tape 37 may be used to fasten the bottom surfaces of the backing material 34 immediately adjacent edges 35 against an associated supporting floor (not shown) by adhering one surface 40 of the tape 37 to the compressible backing material 34 and the other surface 41 of such tape to such supporting floor, or the like. The tape 37 also serves to hold the edges 35 against movement during the seaming operation whereby the edges 35 are fastened together so as to define a substantially invisible seam therebetween as will now be described.

In particular, the free portions 31 of the wear layers 22 of carpeting strips 20 with their release tapes 30 adhered are lifted substantially vertically as indicated by dotted lines at 42 in FIG. 2. With the free portions 31 thus lifted, suitable support means 43 (of any type known in the art) is bonded against what will be referred to as isolated portions 44 of the backing material 34. The isolated portions 44 referred to are defined by associated release tapes 30. The support means 43 in this example comprises double-adhesive-back-tape with the bottom surface 46 of tape 43 being bonded against the isolated portions 44. At this point, the release tape 30 is removed from one of the carpeting strips 20 to provide freshly exposed adhesive 25 whereupon the free portion 31 is adhered against the top adhesive surface 47 of the tape 43. A similar procedure is followed with the free portion 31 of the wear layer 22 of the other carpeting strip 20 whereby the top surfaces of the free parts 31 are disposed in substantially coplanar relation while defining a substantially invisible junction or seam between adjoining side edges of the carpeting strips 20.

It will be appreciated that this entire operation of joining side edges of a pair of carpeting strips 20 may be achieved without requiring special tools and while employing precision factory cut edges to define a substantially invisible seam between carpeting strips. It will also be appreciated that instead of tape 43 any other suitable support means known in the art may be used to bridge between and join side edge portions of a pair of carpeting strips 20.

DESCRIPTION OF THE OVERALL APPARATUS AND METHOD FOR CONTINUOUSLY PRODUCING A CARPETING STRIP

Having described the carpeting strip 20 and a typical carpet C defined using a pair of such strips, the detailed description will now proceed with an apparatus and method which may be used to make such a carpeting strip and such apparatus and method is illustrated in FIGS. 1A and 1B and designated generally by the reference numeral 50. The apparatus 50 comprises a so-called let-off device 51 which supports a supply roll 52 of a suitable wear layer defining material which is preferably in the form of a fabric and such fabric wear layer will be designated by the same reference numeral 22 as in the completed carpeting strip 20. The supply roll 50 is supported by device 51 for controlled unwinding rotation and the fabric wear layer 22 is fed through a so-called J-box fabric accumulator assembly 53 which may be of any suitable type known in the art and for purposes known in the art.

The fabric wear layer 22 is moved around a turn roll 54 and fed vertically downwardly through a floating roll steering guide assembly 55 which serves to align such wear layer for subsequent operations. The wear layer 22 is then moved through an adjustable fabric tension control assembly 56 which in this example is in the form of a three roll assembly. The assembly 56 provides a controlled constant tension on the wear layer enabling processing thereof in a continuous manner.

The tensioned wear layer 22 is continued over an expander roll 57 which may be a bowed roll which spreads or opens up spaces between yarns or filaments of the fabric for coating purposes. The wear layer then continues to a precoat station 58 of the apparatus 50. At station 58 a so-called knife over roll coater 59 having a suitable knife or doctor blade 60 associated therewith is used to supply a suitable polymeric precoat PC (FIG. 2) between release tapes 30 on the inside surface 23 of the wear layer 22. The precoat PC seals the interstices in the wear layer 22, promotes adhesion of polymeric material defining the backing material 34 to be coated thereagainst, and controls the feel or hand of the wear layer 22.

As the wear layer 22 exits the precoating station 58 and continues through the apparatus 50, photoelectric detector devices 61 are provided and sense opposite side edges thereof and provide appropriate signals which are used to make adjustments in the apparatus 50 which assure precision guiding of the opposed fabric edges into the fabric stretching or swing section of a tenter assembly 62. The opposed edge portions of the fabric wear layer 22 are attached to tenter pins, not shown, by urging the fabric so that such pins extend therethrough.

The tenter assembly 62 serves to initially gradually stretch the wear layer in its swing section to a predetermined precise width shown basically at location 63 which commences what will be referred to as a constant width section of the tenter assembly. During the time that the wear layer 22 is placed on the tenter pins and stretched to a constant width the precoat applied at the precoat station 58 is dried at a precoat drying station 64 by a heater 65 which may be of any suitable type and in this example is in the form of an electrical infrared heater.

The wear layer 22 then continues to a taping station 66 where release tape 30 is applied to the inside or normally concealed surface 23 (concealed in the completed carpeting strip 20) of the wear layer at spaced apart locations on opposite side portions of such wear layer employing a pair of taping devices each at an associated side portion of the wear layer 22 with each taping device having a tape-applying roller 70. During application of each release tape 30 the tape is supported by backup means in the form of a backup roll 71 associated with each tape applying roller 70. As indicated earlier, the release tape 30 is of the type which has adhesive 25 thereon and such adhesive is heat activated immediately prior to application of the tape 30 against the wear layer 22. In this example the heat activation is provided by a hot air blower 72 associated with each tape 30 and the blower 72 has a hot air discharge nozzle. The adhesive 25 remains on the inside surface 23 of the wear layer 22 after removal of the tape 30 as previously mentioned.

The apparatus and method 50 employ a tape bonding station 73 where a pressure roller 74 is employed in cooperation with a backup roller 75. The action of the rollers 74–75 at station 73 assures that the tape 30 applied at the taping station 66 is urged more tightly against the inside surface 23 of the wear layer 22 whereby the final carpeting strip 20 is assured of having the required release tape 30.

The apparatus and method 50 also employ a photoelectric device 76 in association with each tape 30 at uncovered release tape detection station 77 to detect the presence of such tape at each side portion of the wear layer 22. In the event tape 30 is not present on either side portion of such wear layer 22, for any reason, a suitable alarm or signal is provided to indicate the absence of release tape 30 and thereby allow appropriate corrective action to be taken.

The wear layer 22 with release tape 30 adhered to its opposite side portions is then introduced through a backing cushion applying station or foam applying station 80 where a suitable thickness of compressible yet resilient backing material is applied thereon and such material may be in the form of sponge-like rubber, or any suitable latex foam and preferably is in the form of a no-gel foam, i.e., such foam being free of added chemical gelling agents. The backing material 34 is shown in its completed and cured condition in the final carpet C in FIG. 2.

In one exemplary embodiment of a carpeting strip 20 the latex foam cushion 34 was made utilizing a rubber foam latex such as styrene-butadiene rubber. Foam latex is applied at station 80 preferably employing a doctor blade or knife to control the thickness of the foam. In this example a doctor blade 81 is used in spaced relation above wear layer 22 and foam defining the foam cushion 34 is conveyed through a nozzle 82 which is reciprocated across the width of the wear layer 22 and cooperates with the doctor blade 81 to provide a controlled height of the latex foam. Suitable means indicated schematically by a circle 83 may be provided for moving the nozzle 82 in a reciprocating manner across the wear layer and such means 83 may be provided with suitable automatic or semi-automatic controls.

The foam material defining the latex foam cushion 34 is suitably gelled on wear layer 22 at a foam gelling station 84 employing a heating apparatus which in this example is in the form of an oven or lamp assembly 85, FIG. 1B, as it exits the foam applying station 80. The gelling apparatus 85 of this example consists of a plurality of electric heat lamps which serve to stabilize the latex foam cushion for further processing.

The carpet construction defined by wear layer 22 with release tape 30 extending along opposite side edge portions thereof and with the latex foam cushion bonded thereagainst, thereby concealing the tapes 30, is then passed through a drying and curing station 87 for drying and curing purposes. At station 87 an oven 88 of any suitable type known in the art may be employed and may comprise gas fired heaters, electric heaters, or other suitable heating means. The carpet construction of this example makes a plurality of passes through the oven 88 to complete the drying and curing thereof.

The dried and cured carpeting strip 20 with tape 30 along its opposite side portions is introduced into a carpeting strip trimming station 90 immediately after inspection for the presence of covered or concealed release tape 30 as will be described subsequently. At the trimming station 90 a pair of rotary slitters or cutters 91 comprising a cutting apparatus 92 are used to cut the carpeting strip and define a corresponding pair of trimmed strips or ribbons of scrap material which are removed from the apparatus 50 in a manner to be described subsequently. The cutters 91 associating with the two release tapes are precisely controlled and the width of the tapes is such that splitting is achieved so as to define a completed carpeting strip 20 having a precision width while still defining cut tape edges along the full length of the carpeting strip.

The rotary cutters 91 are suitably supported on the cutting apparatus 92 to assure that the carpeting strip 20 is of a precision width and further assure that the width of each release tape 30 remaining with the carpeting strip 20 is sufficient to enable joining of two strips 20 in the manner previously described. Usually three-quarters of an inch of release tape along each side strip 20 is sufficient to define a high strength joint. The cutting apparatus 92 at the cutting station 90 includes a pair of backup rollers 93 each associated with a rotary cutter 91.

The apparatus 50 has a covered or concealed release tape detection station 95 upstream of the trimming station as mentioned earlier where a pair of photoelectric devices 94 are provided and each operatively associates with a cutter 91 enabling the rotary cutters 91 to be adjusted and set for cutting purposes to provide the required width of release tape as well as define the carpeting strip 20 having edges 35 which are factory cut precision edges. The photoelectric device 94 also operatively associates with a marking mechanism 97 comprising the apparatus 50 which operates to continuously mark the foam backing layer 34 with the manufacturers identifying data and or advertising as long as the apparatus 50 is operating satisfactorily. However, if the release tape 30 associated with a particular photoelectric device 94 is either of insufficient width or not present the marking mechanism is suitably automatically operated to cease its marking action. This procedure allows inspection downstream of the mechanism, visually or by other means, whereby a length of carpeting strip, which is defective because it does not have the required width of release tape at each side portion thereof or such tape is not present, may be cut away.

After trimming or cutting the carpeting strip at cutting station 90 a pair of scrap strips or ribbons 98 of trimmed material remain on the tenter pins. The ribbons 98 are conveyed to a trim removal station 100 which employs a trim removal apparatus 101 which operates with associated apparatus to pull the strips 98 from the tenter pins of the tenter assembly whereupon the pulled strips are scrapped.

The trimmed carpeting strip 20 with the correct width of release tape 30 fixed to its opposite side portions is then conveyed vertically downwardly from the backup rollers 93 as shown at 99 and then horizontally beneath the oven 88 as shown at 103 for cooling purposes. The completed carpeting strip is then moved upwardly and over a horizontal section 104 and fed through a conventional J-box accumulator 105 for build up of a quantity of carpeting strip 20 for windup purposes.

The carpeting strip 20 is inspected at an inspection station 106 and predetermined lengths thereof are measured by a length gage 107 and suitably wound to define a supply roll 108 of carpeting strip 20 at a windup station 110. A cutting device indicated schematically by a fragmentary cutting blade 111 is employed to cut the strip 20 across its width once a predetermined length thereof has been wound to define a roll 108. The blade 111 may be reciprocated across the apparatus 50 by a suitable device 112 which is indicated schematically by a circle.

Suitable edge sensing means is provided at station 110 to assure windup of roll 108 in a smooth manner. After windup, the completed roll of carpeting strip 20 is then suitably packaged, either in a carton or wrapped in a protective covering such as a protective plastic film and removed from the windup station 110 employing suitable mechanism such as a fork lift truck, or the like, for storage and/or shipment.

The release tape 30 used in the carpeting strip may be made of paper, plastic or other polymeric material, or any suitable material which is capable of having adhesive material 25 provided thereon and which is capable of being bonded to the inside surface 23 of the wear layer 22. Further, the construction of the release tape 30 is such that once it is removed from its carpeting strip to install same to define a carpet C, the adhesive material 25 originally protected by the tape, remains on the layer 22 and being freshly exposed provides maximum adhesive capabilities.

It will also be appreciated that other apparatus and techniques may be used in the apparatus 50. For example, a bed plate or similar support structure may be used instead of a support roll at the foam applying station 80. In addition, other means such as mechanical height measurement means may be employed at the uncovered release tape detection station 77 to measure the presence of release tape immediately after application thereof instead of using photoelectric devices. In addition, it will also be appreciated that instead of rotary knives at the trimming station 90 other slitting methods and apparatus may be employed, such as laser devices, water jets, shear cut knives, score cut knives, and the like.

For an understanding of this invention only the above general description of the overall apparatus and method 50 has been presented; however, if a more detailed understanding of certain components or subsystems of the apparatus and method 50 is desired reference may be made to the above cross-referenced United States application Ser. No. 28,787 which is incorporated herein by reference thereto.

THE TRIMMING STATION

As mentioned earlier, the dried and cured carpeting strip 20 with tape 30 along its opposite side portions is introduced into a carpeting strip trimming station 90 (FIGS. 3-4) where trimming apparatus 92 is used to cut the carpeting construction and define the carpeting strip 20 and a pair of trimmed strips 98 or ribbons of scrap material on opposite sides thereof which are removed from the apparatus 50.

Figure 8:
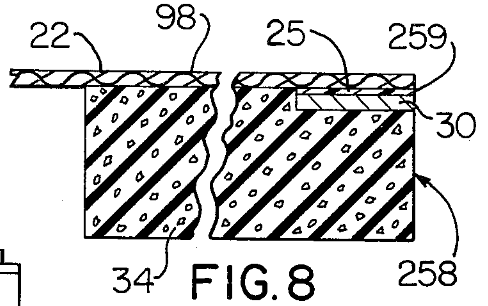
FIG. 8 is an enlarged fragmentary cross-sectional view showing exposed adhesive along an edge of a cut ribbon defined by cutting means.

The trimming apparatus 92 has cutting means in the form of a pair of rotary cutters 91 each of which is employed for cutting through the wear layer 22, tape 30, and backing material 34. The apparatus 92 also has means 257 for positioning each cutter 91 to define the width of the carpeting strip with precision while assuring a predetermined width of release tape 30 remains on the carpeting strip 20 after cutting by the cutters 91 while providing a precision planar cut side edge on each side edge of such carpeting strip designated generally by the reference numeral 258 in FIG. 3. The precision planar cut side edge 258 is defined by an edge of the wear layer 22, adhesive 25, release tape 30, and backing material 34. A corresponding planar cut side edge 258 is defined on each ribbon 98 and it will be appreciated that the edge of the adhesive 25 is exposed on both the carpeting strip and ribbon. To emphasize this condition thereof such adhesive edge is designated by the reference numeral 259 on an enlarged fragmentary portion of a ribbon 98 shown in FIG. 8.

The carpeting strip 20 is particularly adapted to have such a precision cut side edge thereof disposed in abutting relation against a substantially identical carpeting strip having a substantially identical cut side edge while removing the tape 30 from the carpeting strip and a similar tape from the identical carpeting strip and bonding the free parts 31 of the wear layer (as previously described in connection with FIG. 2) together against support means 43 bridging an isolated portion of backing material of the carpeting strip and a similar isolated portion of backing material of the identical carpeting strip to thereby define a substantially invisible joint therebetween.

Each rotary cutter 91 comprises an electric motor assembly 260 which drives a rotary blade 261 through a mechanical connection 262. Each motor assembly 260 is pivotally supported on a support structure 263 and the pivoting of the assembly 260 is provided by an actuator in the form of an air cylinder 264. Each cylinder 264 has its telescoping rod end pivotally connected to a lug 265 on the cutter 91 and its opposite end pivotally connected on another lug 266 provided on the support structure 263. Each air cylinder 264 is provided with air under pressure through a conduit assembly 267 which is controlled by a control system 270 which is in turn supplied with air under pressure from a source 271 whereby each cutter 91 and its blade 261 are moved into and out of cutting engagement.

The cutting apparatus 92 has a backup roller 93 operatively associating with each rotary cutting blade 261 of each cutter 91. Each roller 93 has a planar side edge 272 thereof disposed on one side of and closely adjacent is associated rotary cutting blade 261 as shown at 273 to thereby define the precision cut edge 258 at each side of the carpeting strip 20. Although in this example, the backup rollers 93 are disposed inwardly of their associated blades 261, toward the center of the apparatus, it will be appreciated that such rollers may be disposed outwardly of blades 261.

The trimming apparatus 92 has a pair of support columns 275 on opposite sides thereof and such columns are particularly adapted to support the positioning means 257 for positioning each cutter 91 and in particular each rotary cutting blade 261 independently of the tenter assembly 62. The positioning means 257 comprises a rod 276 which has right hand threads 277 at one end portion thereof and left hand threads 278 at its opposite end portion. The right hand cutter 91 (as viewed in FIG. 4) has a threaded member 281 provided with corresponding right hand threads and which is in threaded engagement with the threaded portion 277; and, the left hand cutter 91 has a threaded member 282 which is provided with left hand threads and is in threaded engagement with the threaded portion 278. The opposite ends of the rod 276 are suitably supported in anti-friction bearings provided in associated columns 275 so that the member 276 is disposed substantially horizontally above the carpet construction.

The means 257 for positioning cutters 91 also comprises a pulley 283 fixed to one end of the rod 276 and such pulley is driven by an endless driving member which may be in the form of an endless power transmission belt 284. The belt 284 is operatively connected to a pulley 285 which is fixed to a shaft 286 which is driven by a reversible electric motor 287. The positioning means 257 enables movement of the cutters 91 toward each other by rotating the motor 287 in one direction and movement of the cutters 91 away from each other by rotating the motor 287 in an opposite direction.

The trimming apparatus 92 is adjusted so that the tape 30 is cut by cutters 91 at the desired position at each side edge of the carpet construction to define cut edges 258. Further, the cutting action is controlled to provide a minimum width of release tape 30 (generally of the order of 3/4 of an inch or more) at each side edge of carpeting strip 20 for the purpose of providing an invisible joint between adjoining carpeting strips 20 and in a manner previously described. To assure that each release tape 30 extends to its cut edge 258, a concealed release tape detection apparatus is provided at station 95, as will now be described.

CONCEALED RELEASE TAPE DETECTION STATION

Figure 3:
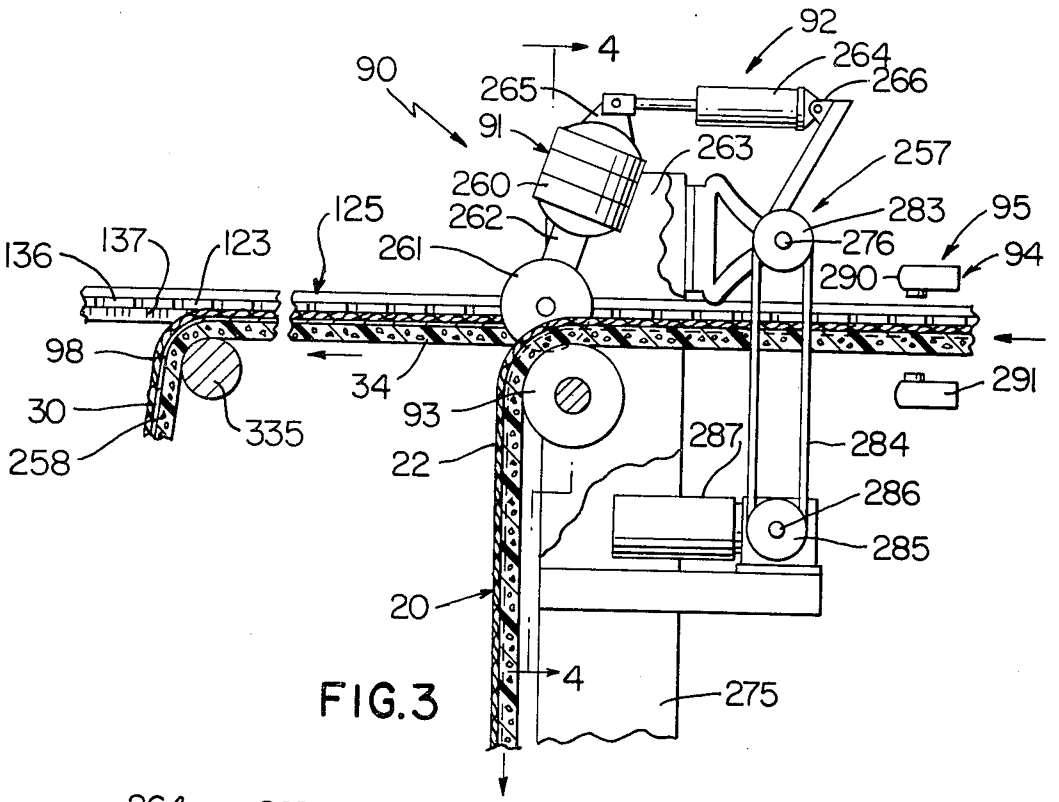
FIG. 3 is a view with parts in cross-section, parts in elevation, parts broken away, and parts shown schematically particularly illustrating trimming apparatus provided at a trimming station of the apparatus of FIGS. 1A and 1B and employed in defining the carpeting strip of FIG. 2 and trimmed ribbons on opposite sides of trimmed carpeting strip.
Figure 4:
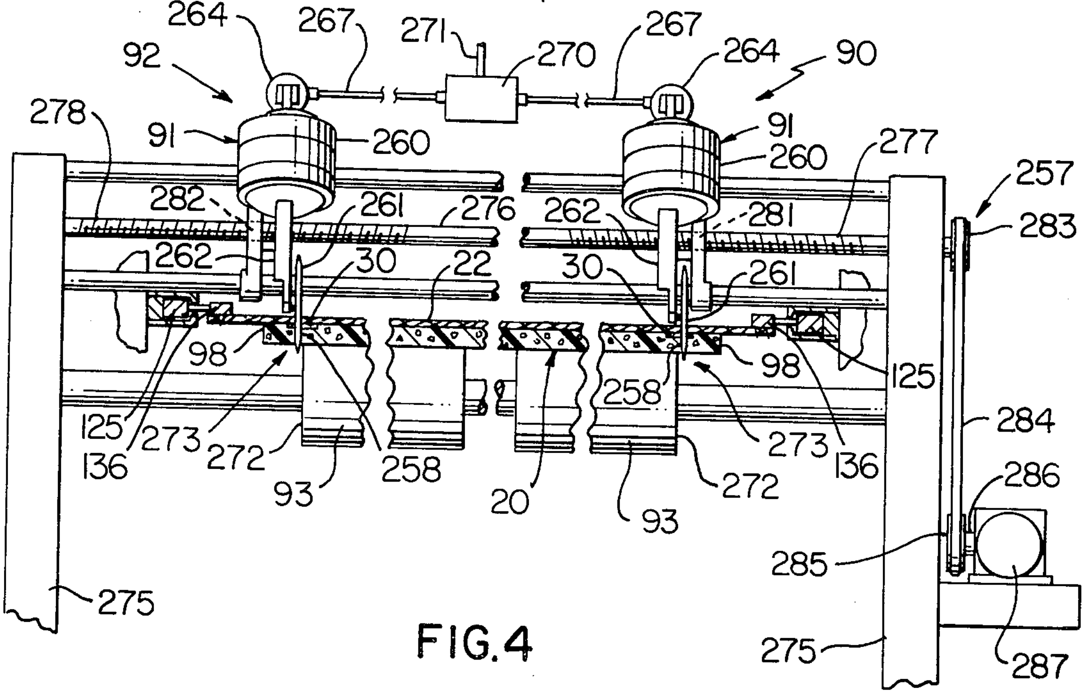
FIG. 4 is a view taken essentially on the line 4—4 of FIG. 3.

As previously mentioned, the apparatus 50 has a covered or concealed release tape detection station 95 immediately upstream of the trimming station 90, FIG. 3. At station 95 a pair of photoelectric devices 94 are employed and each photoelectric device 94 detects the presence of release tape 30, the width of such tape, and enables setting of its cutting device to define cut edge 258 which has the outer edge of tape 30 coplanar with and defined as a part of such cut edge 258. Each photoelectric device 94 includes a sending unit 290 and an associated receiving unit 291. Each device 94 also has signalling means (not shown) associated therewith for providing an appropriate signal in the event that the release tape 30 is either not present, is not in the required position, or is not of the required width. The signalling means provides an appropriate signal which enables the operator of the apparatus 50 to take corrective action including making the necessary adjustment of the trimming apparatus to cut the release tape as required as well as adjust the taping devices at the taping station 66 to place each tape in the required position. Each photoelectric device 94 also operatively associates with the previously mentioned marking mechanism 94 comprising the apparatus 50 as previously described.

THE TRIM REMOVAL STATION

The apparatus 50 has means for continuously moving the wear layer 22 in a rectilinear path and such moving means comprises a tenter assembly 62 as previously mentioned. The tenter assembly 62 has an upstream swing section and a downstream constant width section with a pair of endless chain drive mechanisms or endless chains 125, one on each side of the apparatus 50, providing movement through both the swing and constant width sections, FIGS. 3 and 4. Each of the endless chains 125 comprises a plurality of chain links 123 interconnected by pins, as is known in the art. Each chain link has a so-called pin plate 136 suitably fixed thereto and each pin plate has tenter pins 137 fixed thereto and extending therefrom. The tenter pins hold the wear layer 22 at a precise width in the constant width section of the tenter assembly to enable fixing each of the release tapes 30 against such wear layer 22 at a precise position. The pair of endless chains 125 on opposite sides of the tenter assembly 62 are driven by suitable drive sprockets as is known in the art.

As mentioned earlier, after trimming or cutting the carpeting strip 20 at the trimming station 90 a pair of scrap strips or ribbons 98 of trimmed material remain on the tenter pins 137. The ribbons 98 are conveyed to the trim removal station 100 which employs trim removal apparatus or stripping apparatus 101 (FIG. 7) for stripping the ribbons 98 from the tenter pins of the tenter assembly 62 for scrapping purposes.

Figure 6:
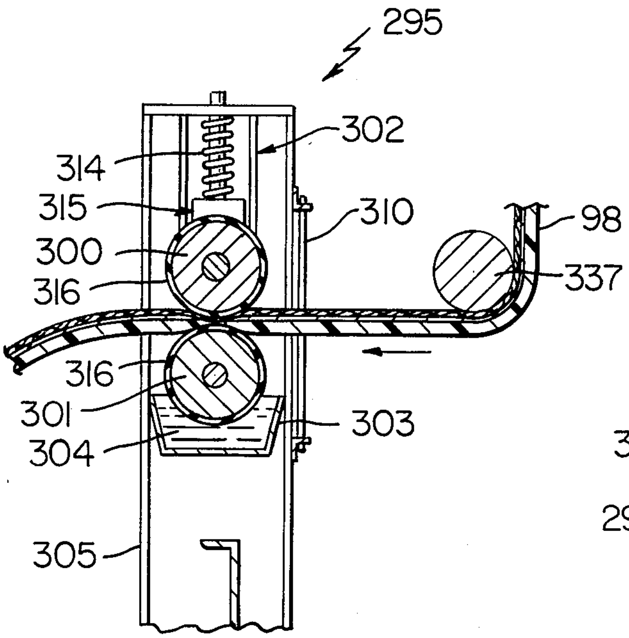
FIG. 6 is a view taken essentially on the line 6—6 of FIG. 5.
Figure 7:
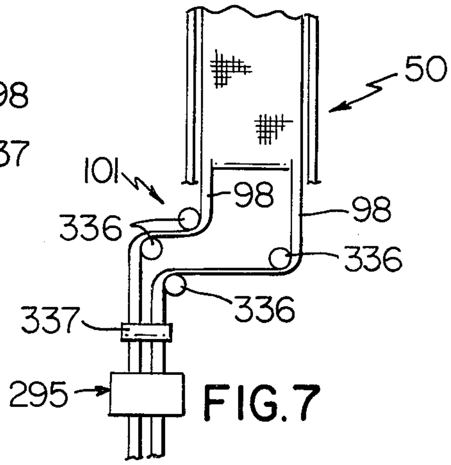
FIG. 7 is a primarily schematic view showing the location of the device of FIG. 5 relative to the overall apparatus.
Figure 5:
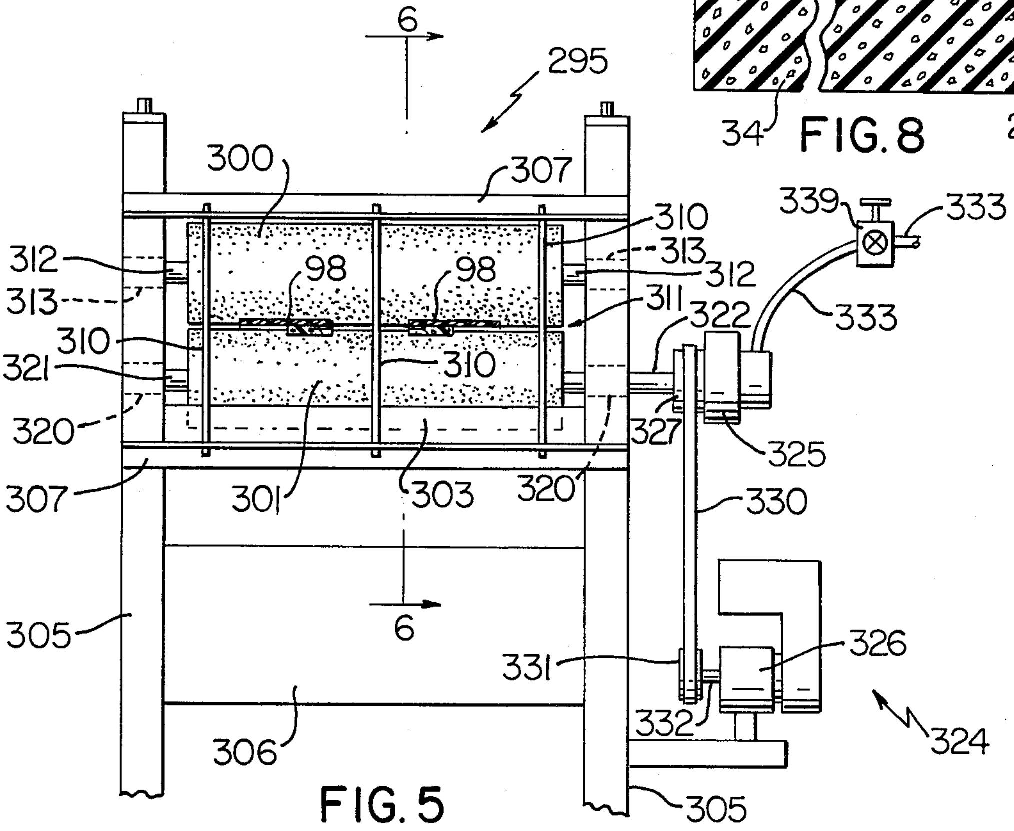
FIG. 5 is a view of a stripping device comprising the stripping apparatus of this invention.

The stripping apparatus 101 includes a trim removal or stripping apparatus or device 295 as illustrated in FIGS. 5-7 and such device is disposed to one side of the tenter assembly 62 and in particular to one side of the overall apparatus 50 for easy access thereto.

The device 295 has a pair of cooperating rotatable rollers consisting of an upper roller 300 and a lower roller 301 and means designated generally by the reference numeral 302, in FIG. 6, yieldingly urging at least one of the rollers toward the other roller to enable clamping the ribbons 98 therebetween and pulling thereof through such rollers with rotation thereof. The device 295 also has a trough 303 which contains a liquid 304 and the liquid 304 serves to prevent sticking of each ribbon 98 against the rollers even with the exposed adhesive edge 259 of adhesive 25 along the cut edge of each ribbon 98, FIG. 8.

The device 295 has a pair of spaced vertical columnar supports each designated by the same reference numeral 305 and the supports are held in spaced vertical positions by a lower structure 306 and a pair of L-shaped support members each designated by the same reference numeral 307. The device 295 also has a plurality of three spaced apart vertical guide rods 310 and each ribbon 98 is introduced into the nip of the rollers 300 and 301 as shown at 311 between an associated pair of vertical guide rods 310.

As seen in FIG. 5, the upper roller 300 has a pair of shaft portions each designated by the same reference numeral 312 extending from its opposite ends; and, the device 295 has a pair of bearing assemblies each designated by the same reference numeral 313 which are preferably in the form of so-called hanger bearing assemblies, of a type known in the art, and each shaft portion 312 is supported in an associated hanger bearing assembly 313. The upper roller 300 also has compression spring means in the form of a pair of compression springs 314 (FIG. 6) suitably supported by associated structure 315 and the compression springs 314 and structures 315 comprise the previously mentioned yieldingly urging means 302. The urging means 302 serve to yieldingly urge the opposite end portions 312 of the upper roller 302 downwardly to thereby urge the upper roller 302 against the lower roller 301 so that during rotation of the rollers 300 and 301 liquid 304 provided on the lower roller upon bathing the lower portion of roller 301 in such liquid, as contained in trough 303, is also transferred to the upper roller.

As seen in FIG. 6 of the drawing, each of the rollers 300 and 301 has an outer layer made of a compressible resilient polymeric material which in this example is shown as a rubber layer and designated by the reference numeral 316. In actual operation of the device 295 the outer compressible resilient polymeric layers 316 are compressed once the ribbons 98 are urged between the rollers 300 and 301. Actually, there is local deformation of layers 316 at the nip 311 where the ribbons 98 enter between the rollers 300 and 301 whereby rather than being slightly spaced apart as shown in FIGS. 5 and 6 of the drawings the outside surfaces of the layers 316 are actually in contact thereby facilitating transfer of liquid 304 from the lower roller 301 to the upper roller 300.

The lower roller 301 has a pair of shafts 321 and 322 extending from its opposite ends and with anti-friction bearing means 320 rotatably supporting such shafts on the vertical columns 305. The lower roller 301 has drive means, designated generally by the reference numeral 324, for rotating such roller to thereby simultaneously rotate the upper roller 300 yieldingly urged thereagainst by the urging means 302.

The drive means 324 comprises a clutch mechanism 325 and a motor 326 for driving the shaft 322 while operatively connected to the clutch mechanism 325. The clutch mechanism 325 has a pulley or sheave portion 327 which is suitably operatively connected to the shaft 322 and a mechanical connection which may be in the form of an endless power transmission belt 330, is connected between a pulley 331 extending from a shaft 332 of the motor 326 to thereby connect the motor 326 to the shaft 322 through the clutch mechanism 325.

The motor 326 is preferably a variable speed electric motor and the speed thereof is set so that under normal operating conditions the motor 326 provides rotation of the rollers 300 and 301 so that the lineal speed of the ribbons 98 being pulled therethrough corresponds to the speed at which the ribbons are trimmed by the trimming apparatus 92. The clutch 325 is an air operated clutch and is supplied with air under regulated pressure by an air pressure regulator through a line 333 which has a suitable air pressure regulator 339 installed therein; and, the line 333 is connected to a source of air under pressure such as shop air, or the like. The air operated clutch 325 is basically a slip clutch and once there is an excessive pulling force exerted by the rollers 300 and 301 on the ribbons 98 being pulled therethrough, for any reason, the clutch merely slips and does not exert torque on the roller 301 so as to avoid damage of the tenter pins and components carrying such tenter pins. The clutch allows the normal preset rotation of roller 301 to be self-restored once the condition causing excessive pulling force is removed.

Referring now to FIGS. 3 and 7, it is seen that the overall apparatus 101 comprises a support in the form of a support rod 335 disposed at a fixed position beneath the trimmed ribbons 98 and their associated endless chains 125, and hence the associated chain links 123 and pin plates 136, to enable pulling the ribbons 98 against and around rod 335 with a force which is exerted by the device 295 to thereby strip the ribbons 98 from their associated chain links and tenter pins. The apparatus 295 has guide means which enable the ribbons 98 to be pulled substantially perpendicular to their chain links and tenter pins for easy removal from the tenter pins. The guide means comprises a plurality or set of cooperating deep-grooved pulleys each designated by the same reference numeral 336 associating with each ribbon; and, each set of deep-grooved pulleys allows movement of its ribbon in a plurality of planes. The guide means also comprises another rod 337, FIGS. 6-7 associating with each set of pulleys 336; and, each set of pulleys 336 and rod 337 serve to guide each ribbon 98 into the device 295 substantially perpendicular to a common plane through the axes of the upper roller 300 and the lower roller 301.

As mentioned earlier, the device 295 has a trough 303 and such trough 303 is suitably supported on the vertical columns 305 using any suitable means known in the art. The liquid 304 contained in the trough may be tap water, a special liquid, or water containing a suitable soap, or the like, which serves to reduce the tendency of the adhesive 25 at the exposed adhesive edges of ribbons 98 from sticking to the outside surfaces of rollers 300 and 301 even upon contacting same to thereby provide an efficient trimmed ribbon removing operation.

The clutch mechanism 325 may be any suitable clutch capable of operating in the manner specified. One clutch mechanism which has been used successfully is manufactured by the Horton Manufacturing Co., 1170

15th Avenue Southeast, Minneapolis, Minnesota, 55414 and sold under the model designation MW-8066.

In this disclosure of the invention sources of power including electrical power, fluid power such as air under pressure, and the like, for the various components have not been illustrated and described; however, it is to be understood that such power sources may be provided employing any suitable means known in the art. It will also be appreciated that the supports and mechanical drives for the overall moving means of the apparatus 50 including the tenter assembly 62 and for various components of such apparatus have also not been illustrated and described herein and it is to be understood that any suitable means known in the art may be used to define such supports and drives.

While present exemplary embodiments of this invention, and methods of practicing the same, have been illustrated and described, it will be recognized that this invention may be otherwise variously embodied and practiced within the scope of the following claims.

What is claimed is:

1. In an apparatus for continuously making a carpeting strip having integral joining means; said apparatus comprising means for continuously moving a wear layer having a bottom surface and opposed side edges in a rectilinear path; a pair of devices for fixing a pair of release tapes against said bottom surface; each of said devices fixing its release tape adjacent an associated side edge portion of said wear layer employing an adhesive band between each release tape; and said bottom means forming a compressible backing material against said bottom surface and against said tapes so that each of said tapes isolates a portion of said backing material from said wear layer and is sandwiched therebetween; a tenter assembly defined as a part of said moving means; said tenter assembly having a pair of endless chain drive mechanisms comprised of a plurality of chain links having tenter pin plates fixed thereto; each pin plate having tenter pins for holding said wear layer at a precise width to enable fixing each of said release tapes at a precise location thereagainst; a trimming apparatus having a pair of cutting means for cutting through said wear layer, tapes, adhesive bands, and backing material inwardly of said chain links and tenter pins to define said carpeting strip and simultaneously define a pair of trimmed ribbons each carried on tenter pins of an associated endless chain drive mechanism with each ribbon having exposed adhesive along the edge thereof cut by its cutting means; and apparatus for stripping said ribbons from said tenter pins; the improvement in said stripping apparatus comprising, a stripping device having a pair of cooperating rotatable rollers consisting of an upper roller and a lower roller, means yieldingly urging at least one of said rollers toward the other roller to enable clamping said ribbons therebetween and pulling thereof therethrough with rotation of said rollers, and a trough containing a liquid for bathing the lower portion of said lower roller, said liquid serving to prevent sticking of each ribbon against said rollers even with said exposed adhesive along its cut edge.

2. A stripping apparatus as set forth in claim 1 in which said means yieldingly urging comprises compression spring means.

3. A stripping apparatus as set forth in claim 2 in which said upper roller has a pair of anti-friction bearing assemblies supporting opposite end portions thereof for rotation and said compression spring means comprises a pair of compression springs acting against said opposite end portions and urging said upper roller against said lower roller so that during rotation of said rollers liquid is provided on said lower roller and is also transferred to said upper roller.

4. A stripping apparatus as set forth in claim 1 in which said device comprises, a pair of spaced supports, said upper roller has a pair of shaft portions extending from its opposite ends, and a pair of bearing assemblies supporting said pair of shaft portions on said supports.

5. A stripping apparatus as set forth in claim 4 in which said spaced supports are vertical columns and said bearing assemblies are hanger bearing assemblies.

6. A stripping apparatus as set forth in claim 4 in which each of said rollers has an outer layer made of a compressible resilient polymeric material.

7. A stripping apparatus as set forthe in claim 1 in which said upper roller has a pair of anti-friction bearing assemblies supporting opposite end portions thereof for rotation, said means yieldingly urging said one roller comprises means yieldingly urging said upper roller against said lower roller, and further comprising drive means for rotating said lower roller to thereby simultaneously rotate said upper roller yieldingly urged thereagainst.

8. A stripping apparatus as set forth in claim 7 in which said lower roller has a shaft extending from one end thereof and said drive means comprises a clutch mechanism connected to said shaft and a motor for driving said shaft while operatively connected to said clutch mechanism.

9. A stripping apparatus as set forth in claim 8 in which said motor is a variable speed electric motor and said clutch mechanism is an air operated clutch.

10. A stripping apparatus as set forth in claim 1 and further comprising a support disposed at a fixed position beneath said cut ribbons and their associated chain links to enable pulling said ribbons thereagainst by forces exerted by said device to thereby strip said ribbons from their associated chain links and tenter pins.

11. A stripping apparatus as set forth in claim 10 and further comprising guide means for said ribbons enabling said ribbons to be pulled substantially perpendicular to their chain links for easy removal from their tenter pins.

12. A stripping apparatus as set forth in claim 11 in which said guide means comprises a plurality of cooperating pulleys associated with each ribbon.

13. A stripping apparatus as set forth in claim 12 in which said device is disposed to one side of said apparatus for making carpeting strip and said tenter assembly thereof for easy access thereto and said guide means guides each ribbon into said device substantially perpendicular to a common plane through the axes of said upper roller and lower roller.

14. In a method of continuously making a carpeting strip having integral joining means; said method comprising the steps of; continuously moving a wear layer having a bottom surface and opposed side edges in a rectilinear path; fixing a pair of release tapes against said bottom surface with a pair of tape fixing devices; each of said devices fixing its release tape adjacent an associated side edge portion of said wear layer; forming a compressible backing material against said bottom surface and against said tapes so that each of said tapes isolates a portion of said backing material from said wear layer and is sandwiched therebetween; said continuously moving step comprising moving said wear layer employing a tenter assembly; said tenter assembly having a pair of endless chain drive mechanisms comprised of a plurality of chain links having tenter pin plates attached thereto; each pin plate having tenter pins; urging tenter pins of each chain drive mechanism through an assocatied side portion of said wear layer to hold said wear layer in a precise width and enable fixing of each of said release tapes at a precise location thereagainst; cutting through said wear layer, tapes, and backing material inwardly of said chain links and tenter pins employing a pair of cutting means of a trimming apparatus to define said carpeting strips and simultaneously define a pair of trimmed ribbons each carried on tenter pins of an associated endless chain drive mechanism; and stripping said ribbons from said tenter pins; the improvement in said stripping step comprising, stripping said ribbons with a pair of cooperating rotatable rollers of a stripping device consisting of an upper roller and a lower roller, yieldingly urging at least one of said rollers toward and against the other roller to enable clamping said ribbons therebetween and pulling thereof therethrough with rotation of said rollers, and coating the lower portion of said lower roller with a liquid which serves to prevent sticking of said ribbons against said rollers, said liquid being transferred to said upper roller with rotation of said rollers and serving to prevent sticking of said ribbons against said rollers.

15. A method as set forth in claim 14 and comprising the further step of rotatably supporting said upper roller with a pair of anti-friction bearing assemblies which support opposite end portions thereof, said step of yieldingly urging said one roller comprises yieldingly urging said upper roller against said lower roller, and comprising the further step of rotating said lower roller to thereby simultaneously rotate said upper roller yieldingly urged thereagainst.

16. A method as set forth in claim 15 in which said lower roller has a drive shaft extending from one end thereof and said step of rotating said lower roller comprises rotating said lower roller with a motor operatively interposed therebetween said clutch serving to disengage said motor from said drive shaft in the event of excessive tension on said ribbons.

17. A method as set forth in claim 14 comprising the further step of disposing a support at a fixed position beneath said ribbons and their associated chain links after cutting of said ribbons with said cutting means to enable pulling said ribbons thereagainst by forces exerted by said upper and lower rollers of said device to thereby strip said ribbons from there associated chain links and tenter pins.

18. A method as set forth in claim 17 and comprising the further step of guiding said ribbons so that they enter the nip of said upper and lower rollers substantially perpendicular to a common plane through the axes of said upper and lower rollers.

19. A method as set forth in claim 18 in which said guiding step comprises guiding each ribbon employing a plurality of cooperating deep grooved pulleys associated with each ribbon.

20. A method as set forth in claim 19 comprising the further step of diposing said device to one side of said apparatus for making carpeting strip for easy access thereto and said guiding step comprises disposing the cooperating pulleys associated with each ribbon so that they guide said ribbons into said nip and substantially perpendicular to said common plane.

* * * * *